(12) United States Patent
Hsu

(10) Patent No.: US 11,009,919 B2
(45) Date of Patent: May 18, 2021

(54) HINGE MODULE FOR FOLDABLE TYPE DEVICE

(71) Applicant: JARLLYTEC CO., LTD., New Taipei (TW)

(72) Inventor: Yu-Tsun Hsu, New Taipei (TW)

(73) Assignee: JARLLYTEC CO., LTD., New Taipei (TW)

(*) Notice: Subject to any disclaimer, the term of this patent is extended or adjusted under 35 U.S.C. 154(b) by 0 days.

(21) Appl. No.: 16/689,832

(22) Filed: Nov. 20, 2019

(65) Prior Publication Data

US 2020/0310497 A1 Oct. 1, 2020

(30) Foreign Application Priority Data

Mar. 25, 2019 (TW) .................................. 108110239

(51) Int. Cl.
*E05D 3/06* (2006.01)
*G06F 1/16* (2006.01)
(Continued)

(52) U.S. Cl.
CPC ............. *G06F 1/1681* (2013.01); *E05D 3/18* (2013.01); *F16C 11/04* (2013.01); *E05D 3/122* (2013.01); *E05Y 2900/606* (2013.01)

(58) Field of Classification Search
CPC .. E05D 3/12; E05D 3/18; E05D 3/122; E05D 3/06; E05D 3/10; E05D 7/0045; E05D 11/082; E05D 11/087; E05D 2011/085; E05D 2007/0072; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; Y10T 16/547; Y10T 16/541; F16C 11/04
See application file for complete search history.

(56) References Cited

U.S. PATENT DOCUMENTS

| | | | |
|---|---|---|---|
| 8,272,104 B2* | 9/2012 | Chen ...................... | G06F 1/1616 16/354 |
| 8,347,461 B2* | 1/2013 | Chen ...................... | G06F 1/1624 16/354 |

(Continued)

FOREIGN PATENT DOCUMENTS

| | | |
|---|---|---|
| TW | 107113396 | 4/2018 |
| TW | 107116376 | 5/2018 |

*Primary Examiner* — Chuck Y Mah
(74) *Attorney, Agent, or Firm* — Guice Patents PLLC

(57) ABSTRACT

A hinge module for a foldable type device is connected with two casings, and applied to a flexible monitor for being relatively rotated so as to be in a folded status or an unfolded status. Each casing has two casing bodies capable of mutually sliding, the hinge module includes a base and two slide mechanisms, two transmission members of each slide mechanism are pivoted to two pivotal parts of the base, an opposite end of a linkage member and each slide member are connected to each casing body, with a transmission effect provided by each middle transmission member between each linkage member and each slide member and a mutual guiding effect between the casing bodies, each casing body can stably retract and the length variation of the flexible monitor, after being bent, can be compensated through the displacing path, thereby reducing the curvature of a bent portion thereof.

19 Claims, 9 Drawing Sheets

(51) Int. Cl.
  *E05D 3/18* (2006.01)
  *F16C 11/04* (2006.01)
  *E05D 3/12* (2006.01)

(56) References Cited

U.S. PATENT DOCUMENTS

| | | | | |
|---|---|---|---|---|
| 8,559,623 B2* | 10/2013 | Chen | ................ | G06F 1/1624 |
| | | | | 379/433.12 |
| 8,713,757 B2* | 5/2014 | Chen | ................ | G06F 1/1624 |
| | | | | 16/354 |
| 8,971,031 B2* | 3/2015 | Mok | ................ | G06F 1/1656 |
| | | | | 361/679.27 |
| 9,404,298 B1* | 8/2016 | Chen | ................ | G06F 1/1681 |
| 9,518,414 B1* | 12/2016 | Chen | ................ | H05K 5/0226 |
| 9,540,855 B2* | 1/2017 | Kato | ................ | E05D 3/122 |
| 9,677,308 B1* | 6/2017 | Chen | ................ | G06F 1/1681 |
| 9,714,533 B2* | 7/2017 | Kuramochi | ........... | G06F 1/1618 |
| 10,146,266 B2* | 12/2018 | Shibayama | ........... | G06F 1/1618 |
| 10,208,842 B2* | 2/2019 | Chen | ................ | F16H 25/08 |
| 10,480,225 B1* | 11/2019 | Hsu | ................ | E05D 3/12 |
| 10,761,574 B1* | 9/2020 | Hsu | ................ | G06F 1/1616 |
| 2010/0232100 A1* | 9/2010 | Fukuma | ............ | H04M 1/0216 |
| | | | | 361/679.01 |
| 2012/0154999 A1* | 6/2012 | Park | ................ | H04M 1/0237 |
| | | | | 361/679.01 |
| 2012/0192381 A1* | 8/2012 | Zhang | ................ | G06F 1/1681 |
| | | | | 16/366 |
| 2013/0152342 A1* | 6/2013 | Ahn | ................ | F16C 11/04 |
| | | | | 16/354 |
| 2014/0009874 A1* | 1/2014 | Huang | ................ | G06F 1/162 |
| | | | | 361/679.01 |
| 2014/0251044 A1* | 9/2014 | Hsu | ................ | G06F 1/1681 |
| | | | | 74/96 |
| 2018/0067520 A1* | 3/2018 | Maatta | ................ | G06F 1/1681 |
| 2020/0080357 A1* | 3/2020 | Lin | ................ | G06F 1/1641 |
| 2020/0117233 A1* | 4/2020 | Ou | ................ | H04M 1/0216 |
| 2020/0117245 A1* | 4/2020 | Ou | ................ | H04M 1/0268 |
| 2020/0363843 A1* | 11/2020 | Cheng | ................ | H04M 1/02 |

* cited by examiner

HINGE MODULE FOR FOLDABLE TYPE DEVICE

BACKGROUND OF THE INVENTION

1. Field of the Invention

The present invention relates to a hinge module, especially to a hinge module for a foldable type device.

2. Description of Related Art

Taiwan Patent Applicant No. TW107113396 (corresponding to China Patent Applicant No. CN201810371007.2, and referred as a first prior art) applied by the applicant of the present invention has disclosed a hinge module for a foldable type device, which includes a first support member, a mutual-unfolding hinge, a second support member, a multi-shaft type hinge and a third support member, and can be applied to a flexible display device, so that when the whole structure is folded in an S-like status, the first support member and the second support connected to the mutual-unfolding hinge can be engaged, and an accommodation space is formed in the mutual-unfolding hinge for allowing a bent portion of the flexible display device to be accommodated; however, in the multi-shaft type hinge, there are sufficient distances which have to be saved between four shafts for allowing other components (for example a linkage member, a friction sheet, a linkage plate and a block sheet) to be disposed, thus after the whole structure is in a folded status, a gap is formed between the second support member and the third support member connected to the multi-shaft type hinge, when the flexible display device is desired to be disposed at the same sides of the three support members, the mutual-unfolding hinge and the multi-shaft type hinge, the whole thickness would be affected by the above-mentioned gap.

As such, for reducing the whole thickness, Taiwan Patent Applicant No. TW107116376 (corresponding to China Patent Applicant No. CN2018104874686, and referred as a second prior art) applied by the applicant of the present invention has disclosed a flexible structure and an assembly having the same, which is able to improve the disadvantages of the multi-shaft type hinge disclosed in the first prior art, and capable of reducing a curvature at a bent portion of the flexible monitor while being exposed, wherein the second prior art includes a flexible structure having a plurality of first rotation units, a plurality of connection units and a plurality of second rotation units which are sequentially arranged to be adjacent to each other and mutually stacked; however, the assembly having the flexible structure disclosed in the second prior art includes two symmetrically-arranged flexible structures, a plurality of support rods and two support frames, and two opposite zones of a flexible monitor are respectively combined with the two support frames, a central portion of the flexible monitor is leaned against the plurality of support rods, so that the flexible monitor can work with the two support frames for being relatively rotated, so as to enable the flexible monitor to be in a flattened status or in a bent status, thereby allowing the whole thickness to be reduced while the whole structure being bent to a folded status.

Moreover, the applicant of the present invention has a desire to improve the structures disclosed in the first prior art and the second prior art, the applicant of the present invention wants to reduce the amount of assembling components required in the two prior arts without increasing the whole thickness after the whole structure is in the folded status, in other words a novel structure, unlike the technical features of the two prior arts, allowing the two support members of the first prior art and the two support frames of the second prior art to be mutually stacked and folded is developed, and the exposed curvature defined after the flexible display device and the flexible monitor after being folded is unlikely to be enlarged; accordingly, the present invention is provided.

SUMMARY OF THE INVENTION

One primary objective of the present invention is to provide a hinge module, in which during a process of the whole structure being bent, the connecting relations and the structural characteristics of two linkages, two slide members and two middle transmission members work with a casing guiding structure respectively formed at an edge and a lateral side between two casings, a compensating folding/unfolding path mechanism can be effectively thinned, thereby simplifying required components so as to reduce the production cost. When the whole structure is bent or flattened, the stability in transmission can be maintained; when the whole structure is bent, a central portion, in an exposed cured status, of the flexible monitor is provided with a small curvature, and when the whole structure is flattened, a stable supporting effect can also be provided to the central portion of the flexible monitor.

For achieving said objective, one technical solution provided by the present invention is to provide a hinge module for a foldable type device, respectively connected to a casing, a flexible monitor is disposed at the same side of the hinge module and each of the casings for allowing the flexible monitor to be relatively rotated for being in a folded status or an unfolded status with the two casings, wherein one of the casings has a first casing body and a second casing body capable of sliding relative to the first casing body, and the hinge module includes: a base, having one end thereof formed with a first pivotal part and a second pivotal part spaced with an interval; and a slide mechanism including: a first linkage member, having one end part thereof pivoted to the first pivotal part, wherein an opposite end part of the first linkage member is connected to the first casing body; a second linkage member, having one end part thereof pivoted with the second pivotal part, wherein a pivotal connecting point is formed between two end parts of the second linkage member, another end part of the second linkage member is able to relatively displace and positioned in the first linkage member, and the another end part is formed with a first action zone; a slide member, having one end part thereof capable of relatively sliding and positioned in the first casing body, wherein another end part of the slide member is connected to the second casing body, and a second action zone is formed between two end parts of the slide member; and a middle transmission member, pivoted to the first casing body, wherein a third action zone and a fourth action zone are respectively formed between two end parts of the middle transmission member, the fourth operation zone interacts with the second operation zone, the third operation zone interacts with the first operation zone, so that another end part of the second linkage member and the slide member are able to displace towards opposite directions, and the second casing body is driven by the slide member to form a relative movement with the first casing body; accordingly, the two casing bodies of one of the casings is able to mutually slide, and a slide mechanism is provided in the casing for achieving effects of compensating a folding/ unfolding path differentiation, effectively allowing the casing to be thinned and simplifying required components in the slide mechanism.

According to one embodiment of the present invention, the another casing has a third casing body and a fourth casing body capable of sliding relative to the third casing body, which are formed as corresponding structures relative to the first casing body and the second casing body, and symmetrically disposed at two ends of the hinge module; an opposite end of the base is further formed with a third pivotal part and the a fourth pivotal part symmetrically arranged at the two opposite ends of the base relative to the first pivotal part and the second pivotal part; wherein the hinge module further includes another slide mechanism having: a third linkage member, having one end part thereof pivoted with the third pivotal part, an opposite end part of the third linkage member is connected to the third casing body, and the third linkage member and the first linkage member are formed as corresponding structures; a fourth linkage member, having one end part thereof pivoted with the fourth pivotal part, a pivotal connecting point is formed between two end parts of the fourth linkage member, another end part of the fourth linkage member is able to relatively displace and positioned in the third linkage member, and the another end part of the fourth linkage member is formed with a first action zone, and the fourth linkage member and the second linkage member are formed as corresponding structures; another slide member, having one end part thereof capable of relatively displacing and positioned in the third casing body, wherein another end part of the another slide member is connected to the fourth casing body, a second action zone is formed between two opposite end parts of the another slide member, and the another slide member and the slide member are formed as corresponding structures; and another middle transmission member, pivoted with the third casing body, wherein a third action zone and a fourth action zone are respectively formed between two end parts of the another middle transmission member, the fourth action zone of the another middle transmission member interacts with the second action zone of the another slide member, the third action zone of the another middle transmission member interacts with the first action zone of the fourth linkage member, so that another end part of the fourth linkage member and the another slide member are able to displace towards opposite directions, the fourth casing body is driven by the another slide member to form a relative movement with the third casing body, the another middle transmission member and the middle transmission member are formed as corresponding structures; as such, the another slide mechanism and the slide mechanism are formed as corresponding structures, and symmetrically arranged at opposite two ends of the base; accordingly, with the two casing bodies, defined as one pair, of each of the casings and the slide mechanism being disposed in the casing and the another slide mechanism being disposed in the another casing, effects of compensating a folding/unfolding path differentiation, effectively allowing the casing to be thinned and simplifying required components are provided.

According to one embodiment of the present invention, the second linkage member has a linkage rod and a linkage plate; one end part of the linkage rod is pivoted with the second pivotal part, an opposite end part of the linkage rod is pivoted with one side of the linkage plate so as to formed the pivotal connecting point, an opposite end part of the linkage rod is protruded with a convex shaft, the convex shaft and the pivotal connecting point are arranged at a same rotating central line, the side of the linkage plate is protruded with a wing sheet, and the wing sheet is arranged to be parallel to the convex shaft, so that the wing sheet and the convex shaft are able to be respectively positioned in an elongated guiding slot with a relative sliding means, the elongate guiding slot is formed between an opposite end part of the first linkage member and the first casing body, thereby allowing the slide member to stably operate in a limited space defined in the casing.

According to one embodiment of the present invention, the fourth linkage member has a linkage rod and a linkage plate; one end part of the linkage rod is pivoted with the fourth pivotal part, an opposite end part of the linkage rod is pivoted with one side of the linkage plate so as to formed the pivotal connecting point, an opposite end part of the linkage rod is protruded with a convex shaft, the convex shaft and the pivotal connecting point are arranged at a same rotating central line, the side of the linkage plate is protruded with a wing sheet, and the wing sheet is arranged to be parallel to the convex shaft, so that the wing sheet and the convex shaft are able to be respectively positioned in an elongated guiding slot with a relative sliding means, the elongate guiding slot is formed between an opposite end part of the third linkage member and the third casing body, thereby allowing the another slide member to stably operate in a limited space defined in the casing, and the two slide mechanisms are able to facilitate the effect of compensating the folding/unfolding path differentiation.

According to one embodiment of the present invention, the first action zone is formed as an axial guiding hole arranged on a plate surface of the linkage plate, the third action zone is a column vertically extended from an end part of the middle transmission member and positioned in the axial guiding hole with a moveable means; one side of the slide member is extended with a lateral wing sheet in a direction towards the middle transmission member, the second action zone is a column vertically extended from a sheet surface of the lateral wing sheet, the fourth action zone is formed as an elongated guiding hole arranged at another end part of the middle transmission member, the column of the slide member is positioned in the elongated guiding hole of the middle transmission member with a moveable means; accordingly, the second transmission member, the slide member and the middle transmission member of the slide mechanism are able to mutually link in a limited space defined in the casing.

According to one embodiment of the present invention, the first action zone is formed as an axial guiding hole arranged on a plate surface of the linkage plate, the third action zone is a column vertically extended from an end part of the another middle transmission member, the column is positioned in the axial guiding hole of the fourth linkage member with a moveable means; one side of the another slide member is extended with a lateral wing sheet in a direction towards the another middle transmission member, the second action zone is a column vertically extended from a sheet surface of the lateral wing sheet, the fourth action zone is formed as an elongated guiding hole arranged at another end part of the another middle transmission member, the column of the another slide member is positioned in the elongated guiding hole of the another middle transmission member with a moveable means; accordingly, the fourth transmission member, the another slide member and the another middle transmission member of the another slide mechanism are able to mutually link in a limited space defined in the another casing, so that the two slide mechanisms are able to facilitate the effect of compensating the folding/unfolding path differentiation.

According to one embodiment of the present invention, the first casing body is formed with an accommodating concave slot, and a wall surface defined in the accommodating concave slot is vertically extended with an internal column, another end part of the second linkage member is formed with a radial guiding hole which is able to be positioned in the internal column of the first casing body with a moveable means, the slide member has an elastic unit, one end of the elastic unit is in contact with a wall surface of the at least one accommodating concave slot, another end of the elastic unit is in contact with the end part of the slide member, thereby reducing negative affections caused by the gaps between each of the components, and movements of the second transmission member, the slide member and the middle transmission member of the slide mechanism can be ensured to be precise.

According to one embodiment of the present invention, the third casing body is formed with an accommodating concave slot, and a wall surface defined in the accommodating concave slot is vertically extended with an internal column, another end part of the fourth linkage member is formed with a radial guiding hole which is able to be positioned in the internal column of the third casing body with a moveable means, the another slide member has an elastic unit, one end of the elastic unit is in contact with a wall surface of the at least one accommodating concave slot, another end of the elastic unit is in contact with the end part of the another slide member, thereby reducing negative affections caused by the gaps between each of the components, and movements of the fourth transmission member, the another slide member and the another middle transmission member of the another slide mechanism can be ensured to be precise, so that the two slide mechanisms are able to facilitate the effect of compensating the folding/unfolding path differentiation.

According to one embodiment of the present invention, at least one lateral guiding rod is extended from a direction defined from the first casing body to the second casing body, and at least one recess and at least one position limiting column are correspondingly formed in the second casing body, so that the at least one lateral guiding rod is allowed to pass the at least one recess, then pass a gap formed between the at least one position limiting column and an inner wall of the casing; opposite surfaces of the slide member and the lateral guiding rod are respectively formed with a position limiting slot and a block piece, the block piece is positioned in the position limiting slot in a moveable means; accordingly, a lateral guiding structure is formed between the two casing bodies of the casing, a stable displacing operation can be provided while a folding/unfolding path differentiation being compensated, and a length range of the compensating folding/unfolding path differentiation is defined by lateral guiding structure.

According to one embodiment of the present invention, at least one lateral guiding rod is extended from a direction defined from the third casing body to the fourth casing body, and at least one recess and at least one position limiting column are correspondingly formed in the fourth casing body, so that the at least one lateral guiding rod is allowed to pass the at least one recess, then pass a gap formed between the at least one position limiting column and an inner wall of the casing; opposite surfaces of the another slide member and the lateral guiding rod are respectively formed with a position limiting slot and a block piece, the block piece is positioned in the position limiting slot in a moveable means; accordingly, a lateral guiding structure is formed between the two casing bodies of the another casing, a stable displacing operation can be provided while a folding/unfolding path differentiation being compensated, and a length range of the compensating folding/unfolding path differentiation is defined by lateral guiding structure, so that the two slide mechanisms, which work with the corresponding casing, are able to facilitate the effect of compensating the folding/unfolding path differentiation.

According to one embodiment of the present invention, an edge of the first casing body and an edge of the second casing body are respectively formed with a first stepped part and a second stepped part which are capable of being correspondingly engaged, the first stepped part is formed with a plurality of elongated ribs which are arranged in parallel, and the second stepped part is formed with a plurality of elongated convex strips which are arranged in parallel, the plurality of elongated ribs and the plurality of elongated convex strips are connected in an interleaved means and capable of mutually guiding each other, so that connecting edges of the two casing bodies of the casing can be respectively formed as an edge guiding structure for increasing the operation stability in the process of compensating the folding/unfolding path differentiation.

According to one embodiment of the present invention, an edge of the third casing body and an edge of the fourth casing body are respectively formed with a third stepped part and a fourth stepped part which are capable of being correspondingly engaged, the third stepped part is formed with a plurality of elongated ribs which are arranged in parallel, and the fourth stepped part is formed with a plurality of elongated convex strips which are arranged in parallel, the plurality of elongated ribs and the plurality of elongated convex strips are connected in an interleaved means and capable of mutually guiding each other, so that connecting edges of the two casing bodies of the another casing can be respectively formed as an edge guiding structure for increasing the operation stability in the process of compensating the folding/unfolding path differentiation, so that the two slide mechanisms are able to utilize the casing bodies of the casing and the casing bodies of the another casing to facilitate the effect of compensating the folding/unfolding path differentiation.

According to one embodiment of the present invention, an extending base is disposed between the two casing bodies, and at least one hinge is disposed in the extending base, the end part of the first linkage member and the end part of the third linkage member are respectively pivoted to the at least one hinge, so that the at least one hinge is pivotally connected to the base; the base is formed with an axial extending part for partially shielding the end part of the first linkage member, the end part of the third linkage member and shielding a slit formed therebetween, thereby providing effects of supporting and prettifying.

According to one embodiment of the present invention, the extending base has a base member and a cover plate covering the base member; at least one installation slot is concavely formed in the base member of the extending base for allowing the at least one hinge to be received; a first position limiting slot, a first hole, a second position limiting slot and a second hole are respectively formed at an axial side of the base member of the extending base, a first protrusion and a first corresponding hole are correspondingly formed on an axial wall surface of the end part of the first linkage member, a second protrusion and a second corresponding hole are correspondingly formed on an axial wall surface of the end part of the third linkage member, the first hole and the second hole and both provided with a spring and a roller interacting with the spring, the two rollers are respectively positioned in the first corresponding hole and the second corresponding hole, the first protrusion is positioned in the first position limiting slot with a moveable means, the second protrusion is positioned in the second position limiting slot with a moveable means; accordingly, a relative rotating range of the two casing bodies can be restrained and the whole structure can be supported to be positioned in the unfolded status or in the folded status.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
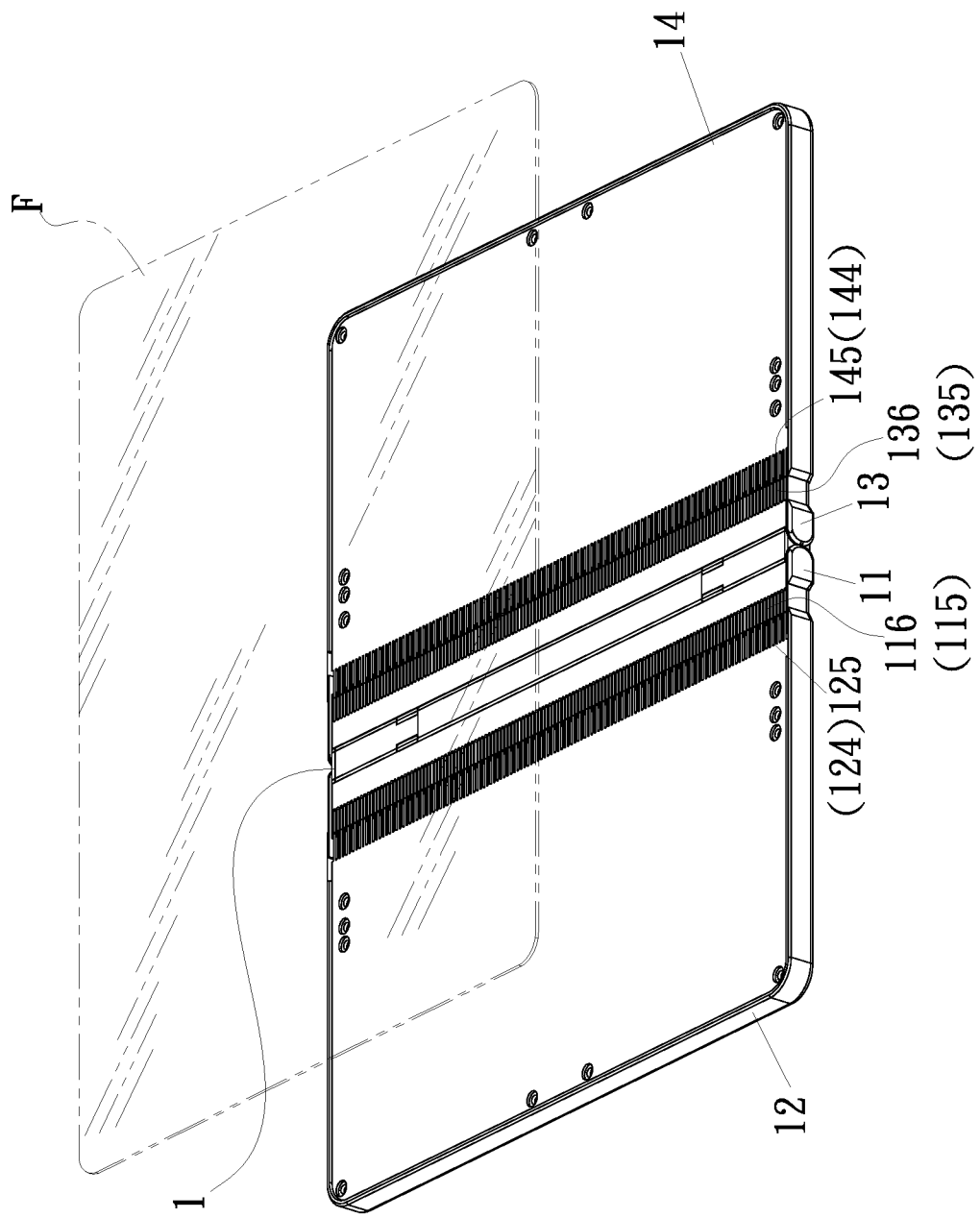
FIG. 1 is a perspective view illustrating the assembly of the hinge module being connected to the two casings and the extending base, wherein the flexible monitor being removed and shown in dashed lines, according to the present invention.

Please refer from FIG. 1 to FIG. 11, according to one preferred embodiment of the present invention, a hinge module 1 is disclosed. Two opposite ends of the hinge module 1 are respectively connected to a casing. A flexible monitor F is disposed at the same sides of the hinge module 1 and the two casings, so that the flexible monitor F can be relatively rotated for being in a folded status or being in an unfolded status with the two casings. The hinge module 1 includes a base 2 and two slide mechanism 3, 3'. The slide mechanism 3 is connected to one of the casings, the slide mechanism 3' is connected to the another casing. The slide mechanism 3 and the another slide mechanism 3' are formed as corresponding structures, and symmetrically arranged at two opposite ends of the base 2. An extending base 4 is disposed between the two casing bodies, and at least one hinge 5 is disposed in the extending base 4. One end part of the slide mechanism 3 (one end part of a first linkage member 31) and one end part of the another slide mechanism 3' (one end part of a third linkage member 31') are respectively pivoted to the at least one hinge 5, so that the at least one hinge 5 can be pivotally connected to the base 2 (a first pivotal part 21 and a third pivotal part 23), respectively.

As shown in FIG. 2, FIG. 5, FIG. 7, FIG. 9, FIG. 10 and FIG. 11, one of the casings has a first casing body 11 and a second casing body 12 capable of sliding relative to the first casing body 11; the another casing has a third casing body 13 and a fourth casing body 14 capable of sliding relative to the third casing body 13, the third casing body 13 and the fourth casing body 14 are formed as a corresponding structure relative to the first casing body 11 and the second casing body 12, and symmetrically disposed at two ends of the hinge module 1, respectively. The two casings are mutually engaged via the two casing bodies, and a retractable movement is able to be generated for working with a length compensating effect generated during a process of the flexible monitor F being bent, thus an action of stably compensating displacement is an important factor to be considered. Accordingly, at least one lateral guiding rods 113, 133 are respectively extended from a direction defined from the first casing body 11 to the second casing body 12 and a direction defined from the third casing body 13 to the fourth casing body 14, and at least one recess 121, 141 and at least one position limiting column 122, 142 are respectively and correspondingly formed in the second casing body 12 and the fourth casing body 14, so that after each of the at least one lateral guiding rods 113, 133 are allowed to respectively pass each of the at least one recesses 121, 141, then respectively pass gaps 123, 143 formed between each of the at least one position limiting columns 122, 142 and an inner wall of each of the casings, thereby enabling each of the at least one lateral guiding rods 113, 133 to be clamped and positioned; as such, a lateral guiding structure are respectively formed in the two casings, a stable operation can be provided while a folding/unfolding path differentiation being compensated, opposite surfaces defined between each of the slide members 33, 33' and each of the lateral guiding rods 113, 133 are formed with a position limiting slot 336 and a block piece 114, 134, and each of the block pieces 114, 143 can be respectively positioned in each of the position limiting slots 336 in a moveable means, thereby defining a length range of the compensating folding/unfolding path differentiation.

Figure 4:
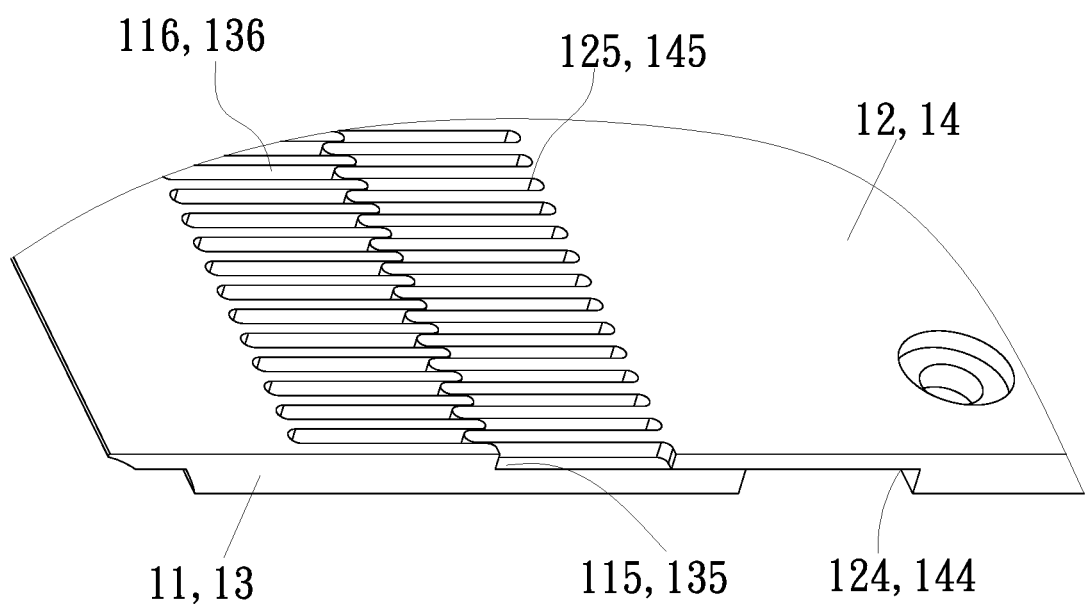
FIG. 4 is a partially enlarged view illustrating the lateral guiding structure of one of the casings according to the present invention.

As shown in FIG. 4, each edges of the first casing body 11 and the second casing body 12 are formed with a first stepped part 115 and a second stepped part 124 which are capable of being correspondingly engaged, each edges of the third casing body 13 and the fourth casing body 14 are formed with a third stepped part 135 and a fourth stepped part 144 which are capable of being correspondingly engaged. The first stepped part 115 and the third stepped part 135 are both formed with a plurality of elongated ribs 116, 136 which are arranged in parallel, and the second stepped part 124 and the fourth stepped part 144 are both formed with a plurality of elongated convex strips 125, 145 which are arranged in parallel, the plurality of elongated ribs 116, 136 and the plurality of elongated convex strips 125, 145 are connected in an interleaved means and capable of mutually guiding each other, so that connecting edges of the two casing bodies of the casing can be respectively formed as an edge guiding structure for increasing the operation stability in the process of compensating the folding/unfolding path differentiation.

Figure 2:
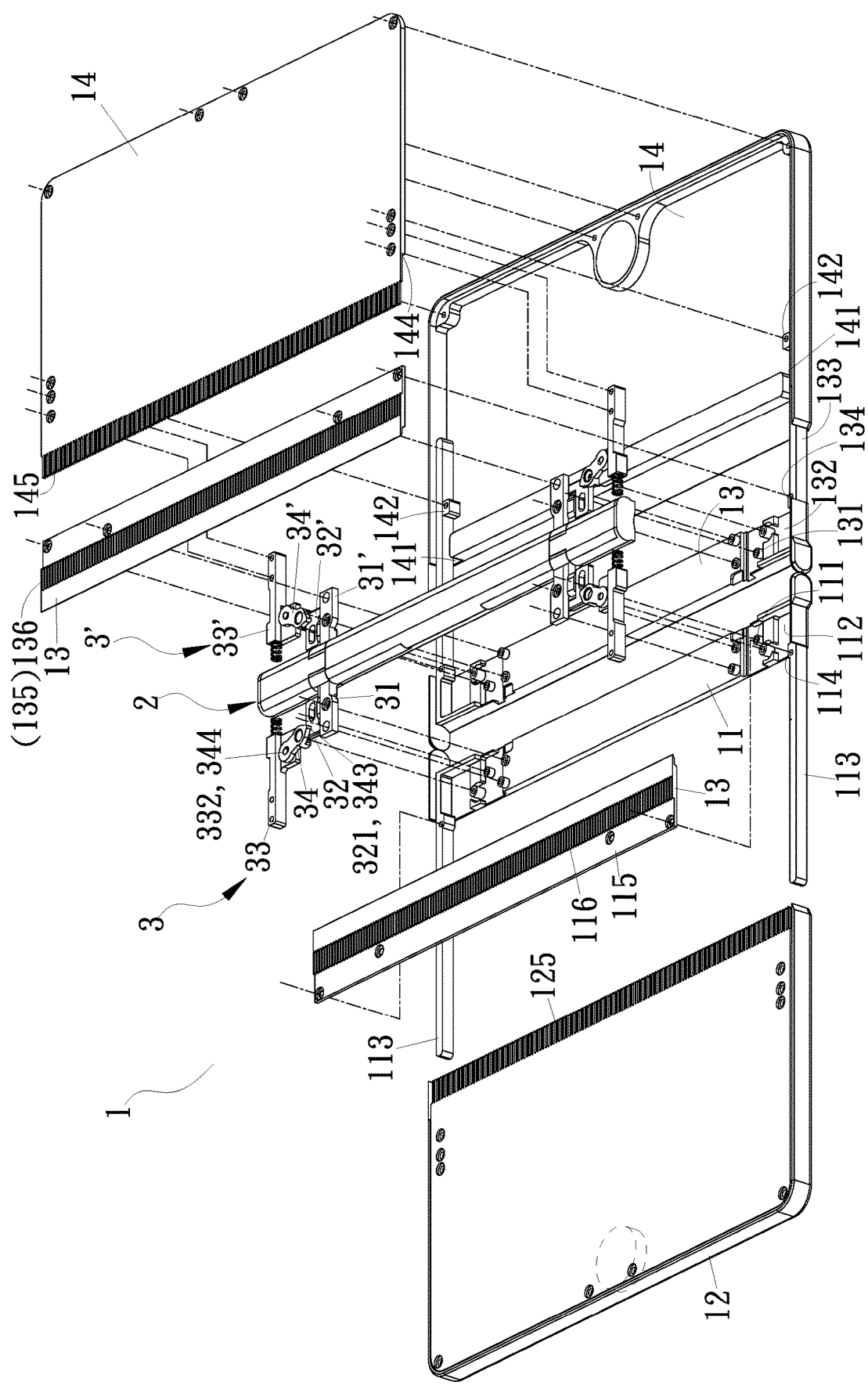
FIG. 2 is an exploded view illustrating the hinge module of FIG. 1 and the extending base being removed from the two casings.
Figure 3:
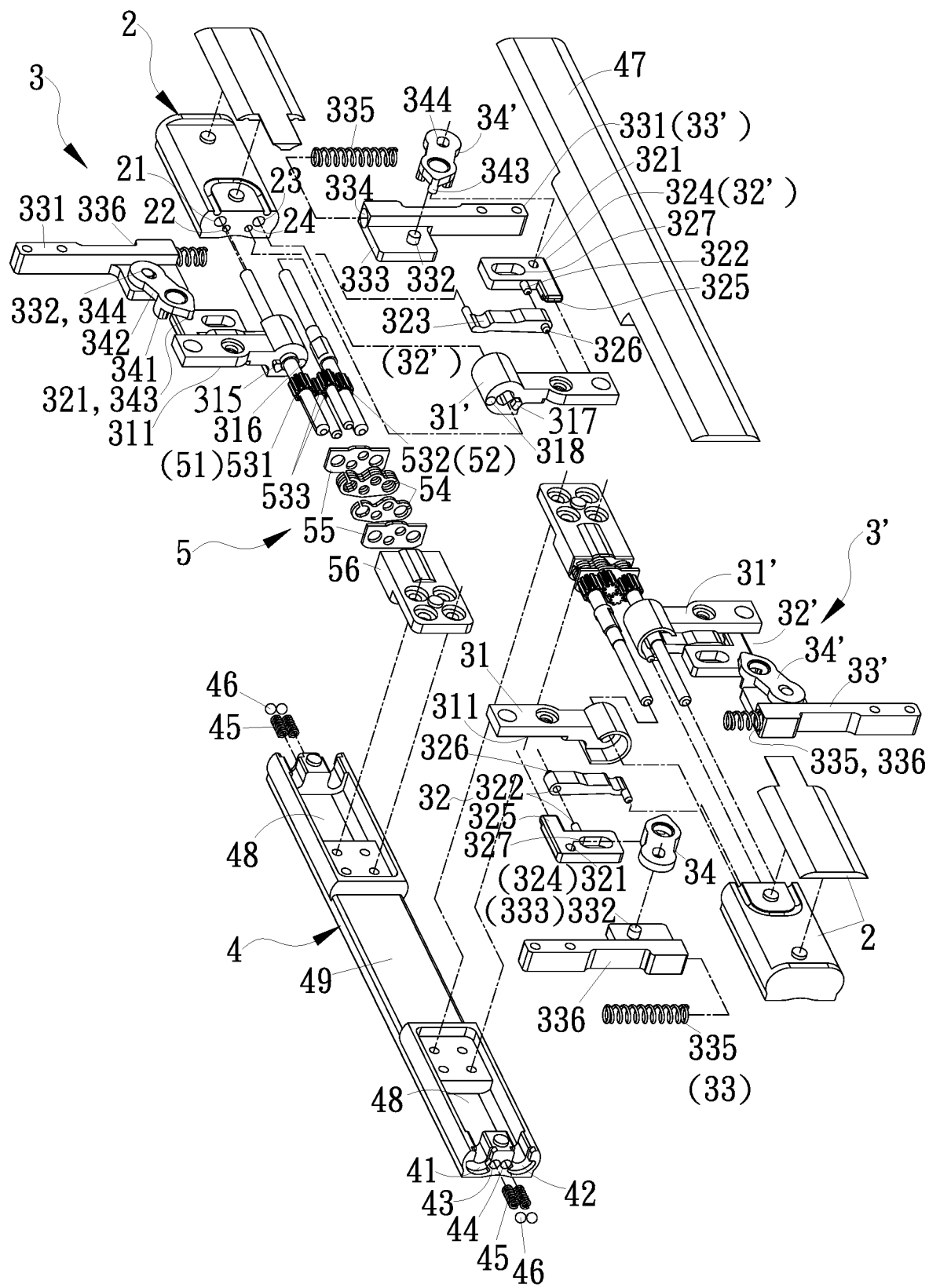
FIG. 3 is an exploded view illustrating the hinge module of FIG. 2 and the extending base.

As shown in FIG. 2 and FIG. 3, one end defined at an axial side of the base 2 is formed with a first pivotal part 21 and a second pivotal part 22 spaced with an interval, an opposite end defined at the axial side of the base 2 is further formed with a third pivotal part 23 and the a fourth pivotal part 24, thus the first pivotal part 21, the second pivotal part 22, the third pivotal part 23 and the fourth pivotal part 24 can be symmetrically arranged at the two opposite end at the axial side of the base 2, respectively; wherein the first pivotal part 21 and the third pivotal part 23 are respectively served as a main rotation center for the hinge module 1, the second pivotal part 22 and the fourth pivotal part 24 are eccentrically disposed at peripheries of the two main rotation centers. The extending base 4 has a base member and a cover plate 47 covering the base member, so that a passageway 49 is formed between the above two component for allowing at least electric wiring to pass, and the at least one electric wiring is allowed to be electrically connected to circuit modules disposed in the two casings. At least one installation slot 48 is concavely formed in the base member of the extending base 4 for allowing at least one hinge 5 to be received. Besides the extending base 4, each of the casings and the base 2 all have a base member and a cover plate covering the base member, thereby facilitating the manufacturing and assembling process. Each of the cover plates is respectively served to support the flexible monitor F, wherein the cover plate of the base 2 is formed with an axial extending part for partially shielding the end part of the first linkage member 31, the end part of the third linkage member 31' and shielding a slit formed therebetween, so that the base 2, the extending base 4, the end part of the first linkage 31 and the end part of the third linkage member 31' can be arranged at the same side for forming a complete contour, and also can be served to a portion where the flexible monitor is disposed, so as to prettify the whole appearance.

Please refer to FIG. 3, one axial side of the extending base 4 is formed with a first position limiting slot 41, a first hole 43, a second position liming slot 42 and a second hole, an axial lateral surface of the end part of the first linkage member 31 is correspondingly formed with a first protrusion 315 and a first corresponding hole 316, an axial lateral surface of the end part of the third linkage member 31' is correspondingly formed with a second protrusion 317 and a second corresponding hole 318; a spring 45 and a roller 46 interacting with the spring 45 are respectively received in the first hole 43 and the second hole 44, the two rollers 46 are able to be respectively positioned in the first corresponding hole 316 and the second corresponding hole 318; as such, during the end part of the first linkage member 31 and the end part of the third linkage member 31' respectively rotating relative to the axial side of the extending base 4, the two rollers 46 are able to contact the axial lateral surface of the end part of the first linkage member 31 and the axial lateral surface of the end part of the third linkage member 31' via an elastic action force of the corresponding spring 45 till each of the rollers 46 respectively entering the first corresponding hole 316 and the second corresponding hole 318, thereby forming a positioning effect. Accordingly, the whole structure can be supported so as to be positioned in the flattened status or the folded status, the first protrusion 315 is positioned in the first position limiting slot 41 with a moveable means, so that a rotating range of the first linkage member 31 is limited between two opposite slot surfaces of the first position limiting slot 41, the second protrusion 317 is positioned in the second position limiting slot 42 with a moveable means, so that a rotating range of the third linkage member 31' is limited between two opposite slot surfaces of the second position limiting slot 42.

As shown in FIG. 3, the at least one hinge 5 further has a first shaft 51, a second shaft 52, a first gear 531, a second gear 532, at least one middle gear 533, a plurality of torsion units 54, a plurality of connecting units 55, 56; the first gear 531 is coaxially combined with the first shaft 51, the second gear 532 is coaxially combined with the second shaft 52, the at least one middle gear 533 is arranged between the first gear 531 and the second gear 532, thereby forming a gear engaging and a synchronously operating status; a rotation axis line of the first shaft 51, a rotation axis line of the second shaft 52 and a rotation axis line of the at least one middle gear 533 are arranged in a parallel status, and the first shaft 51, the second shaft 52 and the at least one middle gear 533 respectively sleeve with the plurality of torsion units 54 and the plurality of connecting units 55, 56, so that a stable assembling status is established, and effects of synchronously rotating and generating torsions are provided, and the at least one hinge 5 is fastened in the at least one installation slot 48 through the connecting unit 56, the first shaft 51 and the second shaft 52 are allowed to respectively pass the first position limiting slot 41 and the second position limiting slot 42, so as to be pivotally connected and pass a shaft hole at the end part of the first linkage member 31 and a shaft hole at the end part of the third linkage member 31' then respectively pivoted with the first pivotal part 21 and the third pivotal part 23 of the base 2, one end part of each of the linkage members is combined with a shaft thereof so as to be formed as an integrated structure and to be respectively pivoted to each of the pivotal parts of the base 2.

Figure 5:
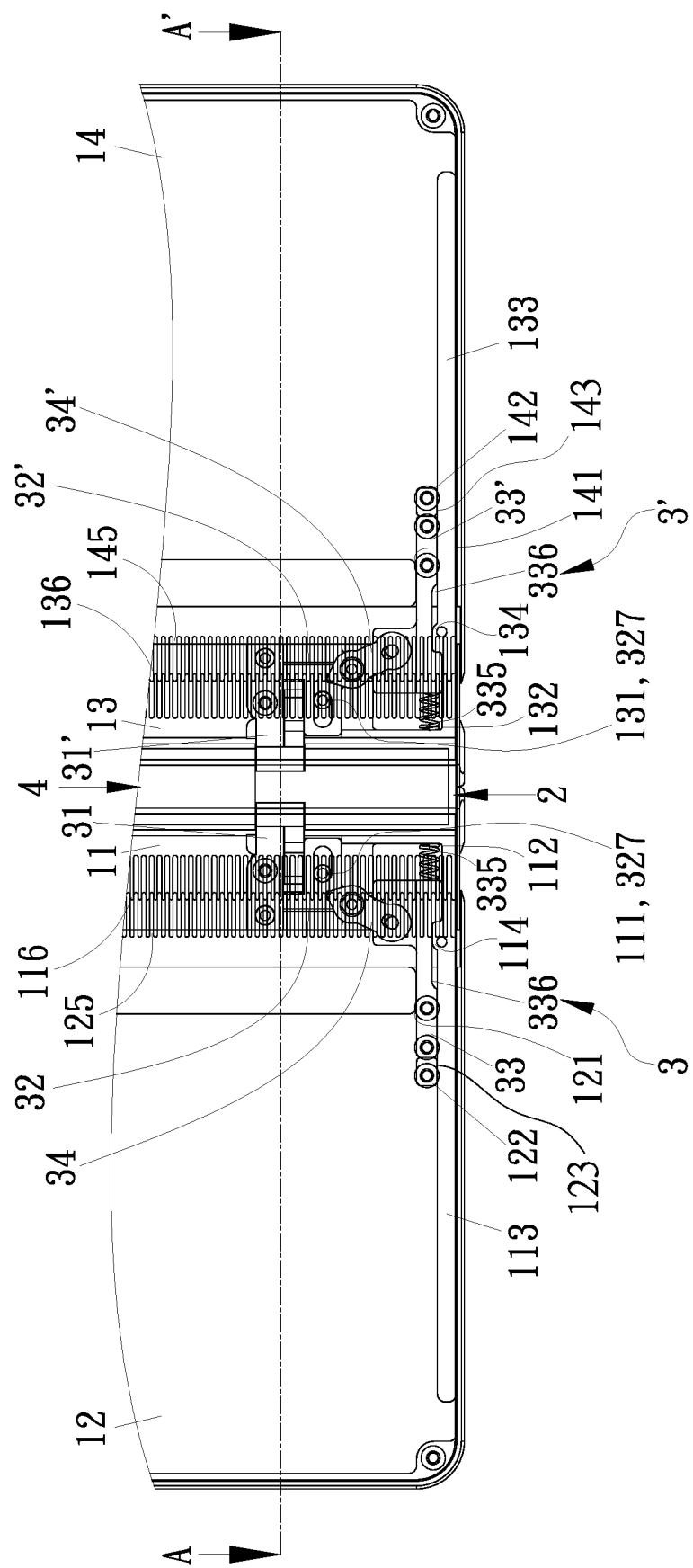
FIG. 5 is a partial top view illustrating the present invention being in a flattened status, wherein the plate member of each of the casings being shown in dashed lines, according one preferred embodiment of the present invention.
Figure 6:
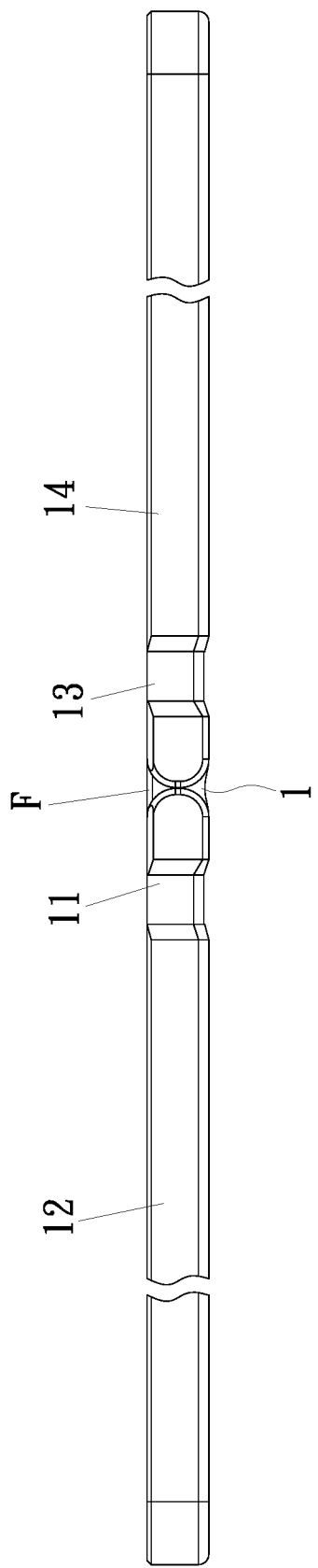
FIG. 6 is a side view illustrating the assembly of FIG. 1 according to the present invention.
Figure 7:
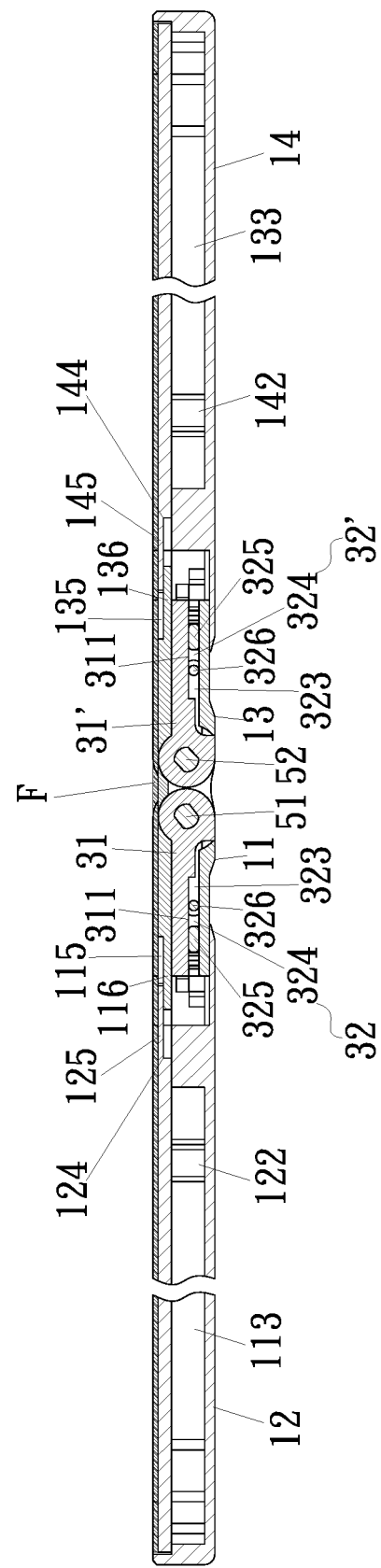
FIG. 7 is a cross sectional view of FIG. 5 taken along an A-A' line.
Figure 8:
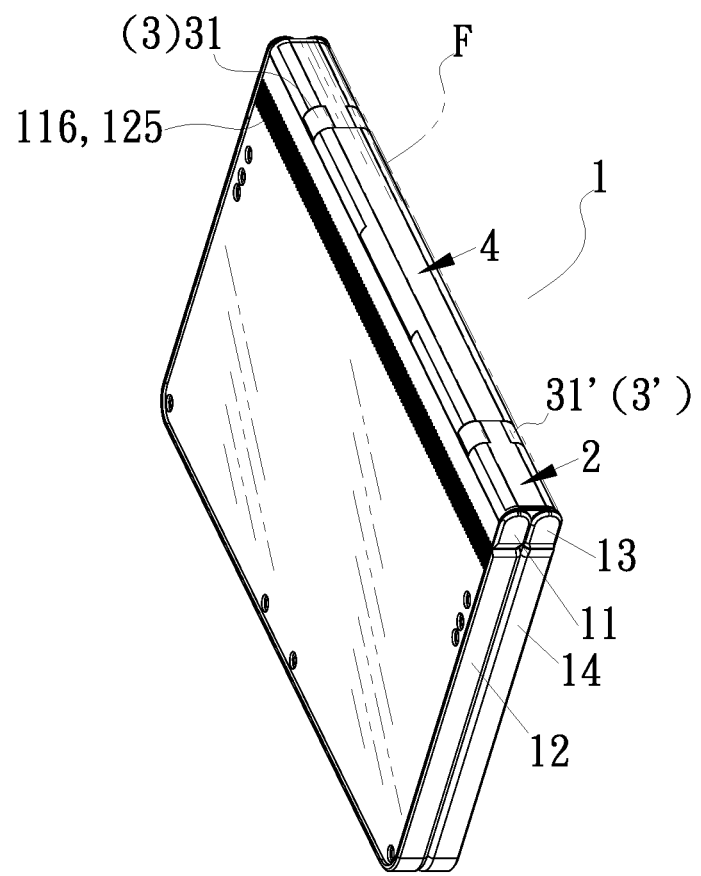
FIG. 8 is a perspective view illustrating the assembly of FIG. 1 being in a folded status according to the present invention.
Figure 9:
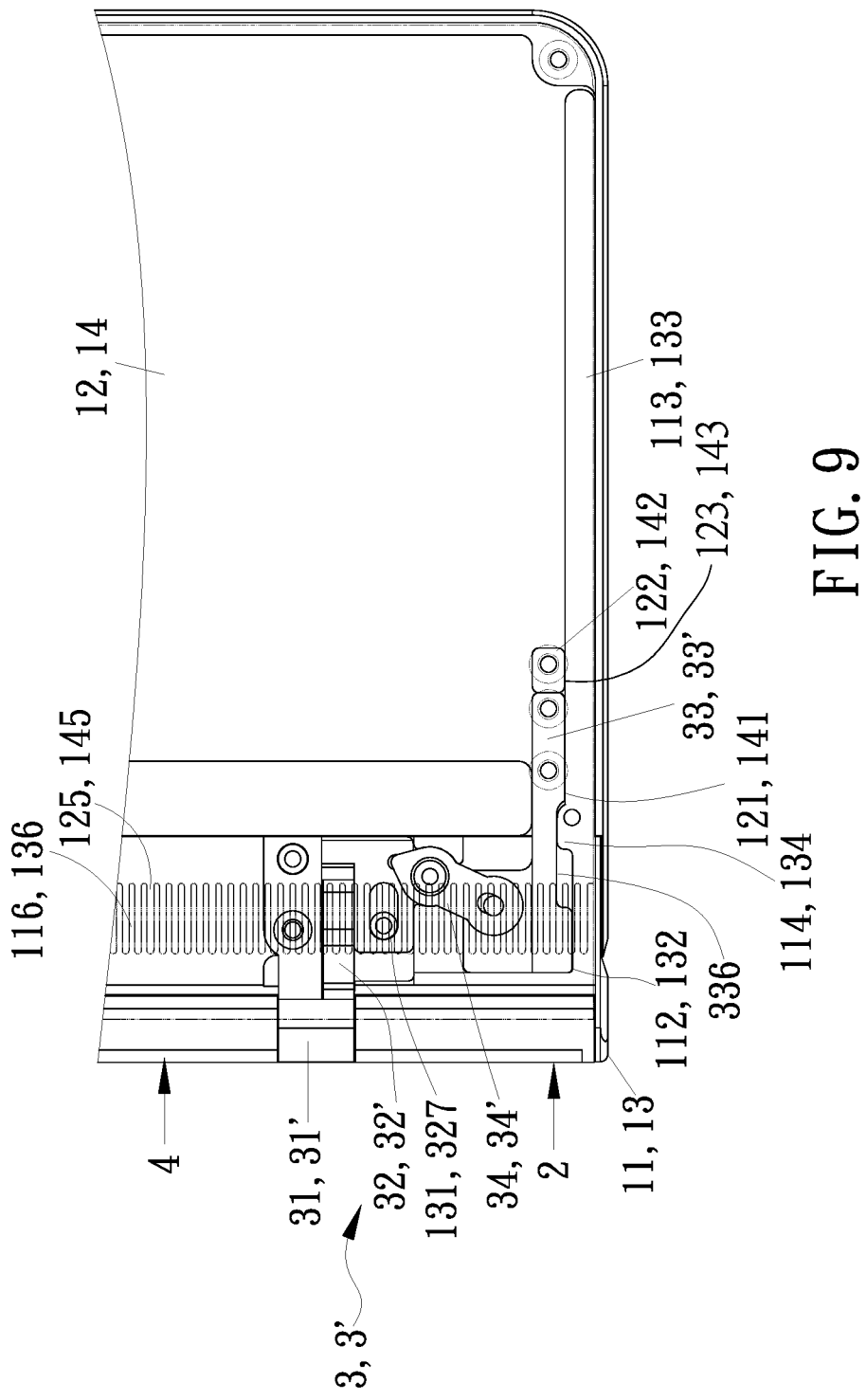
FIG. 9 is a partial top view illustrating the present invention being in the folded, wherein the plate member of each of the casings being shown in dashed lines, according one preferred embodiment of the present invention.
Figure 10:
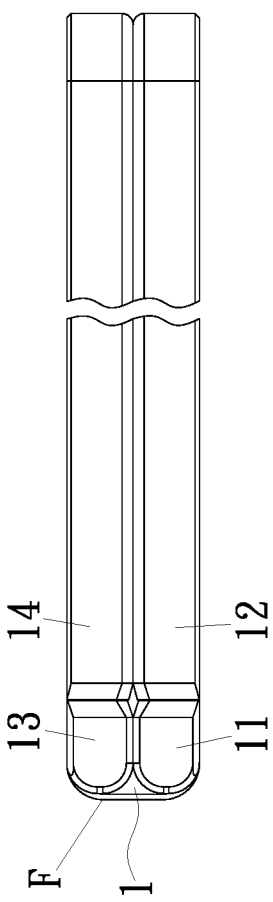
FIG. 10 is side view illustrating the present invention shown in FIG. 6 being in a bent status.
Figure 11:
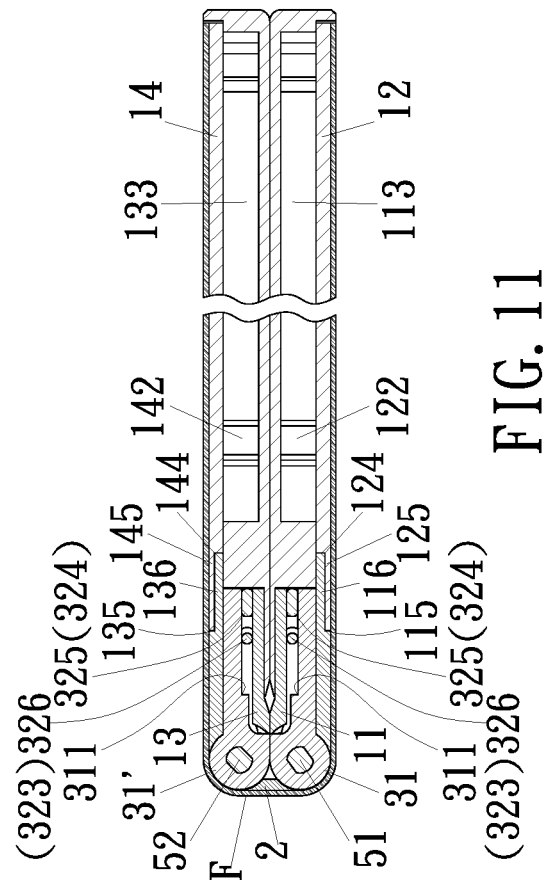
FIG. 11 is side view illustrating the present invention shown in FIG. 7 being in a bent status.

As shown in FIG. 3, FIG. 5 and FIG. 9, the slide mechanism 3 has the first linkage member 31, a second linkage member 32, a slide member 33 and a middle transmission member 34; wherein one end part of the first linkage member 31 is pivoted with the first pivotal part 21 via the first shaft 51, an opposite end part of the first linkage member 31 is connected to fastened with an inner wall at one side of the first casing body 11; one end part of the second linkage member 32 is pivoted with the second pivotal part 22 via an integrally-formed shaft, a pivotal connecting point 322 is formed between two end parts of the second linkage member 32, so that a movement can be smoothly performed in a limited space, another end part of the second linkage member 32 is able to move and to be limited between the first linkage member 31 and the first casing body 11, another end part of the second linkage member 32 is further formed with a first action zone 321; one end part of the slide member 33 is able to relatively move and to be limited in the first casing body 11, another end part of the slide member 33 is formed as a connection part 331 capable of protruding into the second casing body 12 and connected to a plate member thereof, and a second action zone 332 is formed between two end parts of the slide member 33. The middle transmission member 34 has a plate member 342 and a pivot 341 served as rotation center of the plate member 342, the middle transmission member 34 is pivoted and positioned on an inner wall defined at the side of the first casing 11 via the pivot 341, and a third action zone 343 and a fourth action zone 344 are respectively formed at two end parts of the plate member of the middle transmission member 34. The fourth operation zone 344 interacts with the second operation zone 332, the third operation zone 343 interacts with the first operation zone 321, so that another end part of the second linkage member 32 and the slide member 33 can displace towards opposite directions, thereby allowing the second casing body 12 to be driven by the slide member 33 to form a relative movement with the first casing body 11.

The another slide mechanism 3' has a third linkage member 31', a fourth linkage member 32', another slide member 33' and another middle transmission member 34', wherein, one end part of the third linkage member 31' is pivoted with the third pivotal part 23 via the second shaft 52, an opposite end part of the third linkage member 31' is connected to fastened on an inner wall defined at one side of the third casing body 13. The third linkage member 31' and the first linkage member 31 are formed as corresponding structures, and symmetrically arranged at two opposite ends of the base. One end part of the fourth linkage member 32' is pivoted with the fourth pivotal part 24 via an integrated-formed shaft, a pivotal connecting point 322 is formed between two end parts of the four linkage member 32', so that a movement in a limited space can be smoother performed, another end part of the fourth linkage member 32' is able to relatively displace and be positioned between the third linkage member 31' and the third casing body 13; another end part of the fourth linkage member 32' is further formed with a first action zone 321, the fourth linkage member 32' and the second linkage member 32 are formed as corresponding structures, and symmetrically arranged at two opposite ends of the base 2. One end part of the another slide member 33' is able to relatively displace and limited in a third casing body 13; another end part of the another slide member 33' is formed as a connection part 331 capable of protruding into the fourth casing body 14 and connected to a plate member thereof, a second action zone 322 is formed between two opposite end parts of the another slide member 33', the another slide member 33' and the slide member 33 are formed as corresponding structures and symmetrically arranged at two opposite ends of the base and spaced from the base 2 with an interval. The another middle transmission member 34' has a plate member 342 and a pivot 341 served as a rotation center to the plate member. The another middle transmission member 34' is pivoted and positioned on the lateral inner wall of the third casing body 13 via the pivot 341. A third action zone 343 and a fourth action zone 344 are respectively formed at two end parts of the plate member 342 of the another middle transmission member 34'. The fourth action zone 344 of the another middle transmission member 34' interacts with the second action zone 332 of the another first slide member 33', the third action zone 343 of the another middle transmission member 34' interacts with the first action zone 321 of the fourth linkage member 32', so that another end part of the fourth linkage member 32' and the another slide member 33' are able to displace towards opposite directions, and the fourth casing body 14 is driven by the another slide member 33' so as to form a relative sliding status with the third casing body 13. The another middle transmission member 34' and the middle transmission member 34 are formed as corresponding structures, arranged at two opposite ends of the base 2, and spaced from the base 2 with an interval.

For enabling the slide mechanism of the present invention to perform a stable movement in the limited space defined inside the thinned casing, the second linkage member 32 and the fourth linkage member 32' both have a linkage rod 323 and a linkage plate 324; one end part of each of the linkage rods 323 is respectively pivoted with the second pivotal part 22 and the fourth pivotal part 24, opposite end parts of each of the linkage rods 323 are respectively pivoted with the side of each of the linkage plates 324 so as to formed the corresponding pivotal connecting point 322, opposite end parts of each of the linkage rods 323 are respectively protruded with a convex shaft 326, each of the convex shafts 326 and the corresponding pivotal connecting point 322 are respectively arranged at a same rotating central line, each of the linkage plates 324 forms a relative movement along the first casing body 11 and the third casing body 13, respectively. One side of each of the linkage plates 324 is respectively protruded with a wing sheet 325, and each of the wing sheets 325 is arranged to be respectively parallel to each of the convex shafts 326. Each of the wing sheets 325 and each of the convex shafts 326 are respectively positioned in an elongated guiding slot 311 with a relative sliding means; accordingly, through each of the wing sheets 325 and each of the convex shafts 326 both sliding in each of the elongated guiding slot 311, the stability and a load sharing effect can be provided, wherein one of the elongate guiding slots 311 is formed between an opposite end part of the first linkage member 31 and the first casing body 11, wherein the another elongated guiding slot 311 is formed between an opposite end part of the third linkage member 31' and the third casing body 13; through each of the linkage members working with each of the casing bodies to form each of the elongated guiding slots 311, the structural strength can be ensured under a situation of reducing the thickness of components.

Each of the first action zones 321 is formed as an axial guiding hole respectively arranged on a plate surface of each of the linkage plates 324, each of the third action zones 343 is a column vertically extended from an end part of each of the middle transmission member 34, 34', the column of each of the middle transmission members 34, 34' is positioned in the axial guiding hole of the second linkage member 32 and the axial guiding hole of the fourth linkage member 32' with a moveable means. One side of each of the slide members 33, 33' is respectively extended with a lateral wing sheet 333 in a direction towards the corresponding middle transmission members 34, 34'; each of the second action zones 332 is a column vertically extended from a sheet surface of each of the lateral wing sheets 333; each of the fourth action zones 344 is formed as an elongated guiding hole respectively arranged at another end part of each of the middle transmission members 34, 34'; the column of each of the slide members 33, 33' is respectively positioned in the elongated guiding holes of each of the middle transmission members 34, 34' with a moveable means.

For limiting a sliding range of the second linkage member 32 and that of the fourth linkage member 32', the first casing body 11 and the third casing body 13 of the present invention are respectively formed with an accommodating concave slots 112, 132, another end part (formed as another linkage plate 324) of the second linkage member 32 and another end part (formed as another linkage plate 324) of the fourth linkage member 32' are respectively formed with a radial guiding hole 327, and a wall surface of the first casing body 11 and a wall surface of the third casing body 13 are vertically extended with an internal column 111, 131, respectively; the inner column 111 of the first casing body 11 and the inner column 131 of the third casing body 13 are respectively positioned in the radial guiding hole 327 of the second linkage member 32 and the radial guiding hole 327 of the third casing body 32; moreover, because each of the slide members 33, 33' is respectively engaged with the two casing bodies of each of the casings, the above-mentioned can be served as a component for affecting the compensating path, a precise movement has to be achieved during the operation, as such, for reducing the possibilities of gaps formed between the components causing a loosened situation or an imprecise sliding movement, each of the slide members 33, 33' further has an elastic unit 335, one end of each of the elastic units 335 is respectively in contact with a wall surface of the at least one accommodating concave slots 112, 132, another end of each of the elastic units 335 is respectively in contact with the position limiting slot 334 of the end part of each of the slide members 33, 33', thereby reducing negative affection caused by the gaps.

Based on what has been disclosed above, advantages achieved by the present invention are as follows. According to the present invention, with the two linkage members working with the middle transmission member and the slide member of each of the slide mechanism, a convex shaft linkage module can be provided, thereby simplifying required components so as to reduce the production cost; moreover, with the edge guiding structure and the lateral guiding structure formed between the two casing bodies and each of the casings, an effect of compensating the path differentiation can be achieved, the load can also be shared, the volume reduced and the thickness can be thinned, so that a whole structure with the compensating path mechanism can be provided; when the whole structure is bent, a small curvature is formed at a central portion of the flexible monitor while being exposed, and a supporting effect can also be provided to the central portion of the flexible monitor while being in a flattened status.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A hinge module for a foldable type device, comprising two casings, a flexible monitor being disposed at a same side of said hinge module and each of said casings for allowing said flexible monitor to be relatively rotated for being in a folded status or an unfolded status with said two casings, wherein one of said casings having a first casing body and a second casing body capable of sliding relative to said first casing body, and said hinge module including:
   a base, having one end thereof formed with a first pivotal part and a second pivotal part spaced with an interval; and
   a slide mechanism, including:
   a first linkage member, having one end part thereof pivoted with said first pivotal part, wherein an opposite end part of said first linkage member is connected to said first casing body;
   a second linkage member, having one end part thereof pivoted with said second pivotal part, wherein a pivotal connecting point is formed between two end parts of said second linkage member, another end part of said second linkage member is able to relatively displace and positioned in said first linkage member, and said another end part is formed with a first action zone;
   a slide member, having one end part thereof capable of relatively sliding and positioned in said first casing body, wherein another end part of said slide member is connected to said second casing body, and a second action zone is formed between two end parts of said slide member; and
   a middle transmission member, pivoted with said first casing body, wherein a third action zone and a fourth action zone are respectively formed between two end parts of said middle transmission member, said fourth action zone interacts with said second action zone, said third action zone interacts with said first action zone, so that another end part of said second linkage member and said slide member are able to displace towards opposite directions, and said second casing body is driven by said slide member to form a relative movement with said first casing body.

2. The hinge module for the foldable type device as claimed in claim 1, wherein another casing of said two casings has a third casing body and a fourth casing body capable of sliding relative to said third casing body, which are formed as corresponding structures relative to said first casing body and said second casing body, and symmetrically disposed in said hinge module; an opposite end of said base is further formed with a third pivotal part and a fourth pivotal part symmetrically arranged at said opposite end of said base relative to said first pivotal part and said second pivotal part; wherein said hinge module further includes another slide mechanism including:
   a third linkage member, having one end part thereof pivoted with said third pivotal part, an opposite end part of said third linkage member is connected to said third casing body, and said third linkage member and said first linkage member are formed as corresponding structures;
   a fourth linkage member, having one end part thereof pivoted with said fourth pivotal part, a pivotal connecting point is formed between two end parts of said fourth linkage member, another end part of said fourth linkage member is able to relatively displace and positioned in said third linkage member, and said another end part of said fourth linkage member is formed with a first action zone, and said fourth linkage member and said second linkage member are formed as corresponding structures;
   another slide member, having one end part thereof capable of relatively displacing and positioned in said third casing body, wherein another end part of said another slide member is connected to said fourth casing body, a second action zone is formed between two opposite end parts of said another slide member, and said another slide member and said slide member are formed as corresponding structures; and
   another middle transmission member, pivoted with said third casing body, wherein a third action zone and a fourth action zone are respectively formed between two end parts of said another middle transmission member, said fourth action zone of said another middle transmission member interacts with said second action zone of said another slide member, said third action zone of said another middle transmission member interacts with said first action zone of said fourth linkage member, so that another end part of said fourth linkage member and said another slide member are able to displace towards opposite directions, said fourth casing body is driven by said another slide member to form a relative movement with said third casing body, said another middle transmission member and said middle transmission member are formed as corresponding structures; as such, said another slide mechanism and said slide mechanism are formed as corresponding structures, and symmetrically arranged at opposite two ends of said base.

3. The hinge module for the foldable type device as claimed in claim 2, wherein said second linkage member has a linkage rod and a linkage plate; one end part of said linkage rod is pivoted with said second pivotal part, an opposite end part of said linkage rod is pivoted with one side of said linkage plate so as to formed said pivotal connecting point, an opposite end part of said linkage rod is protruded with a convex shaft, said convex shaft and said pivotal connecting point are arranged at a same rotating central line, said side of said linkage plate is protruded with a wing sheet, and said wing sheet is arranged to be parallel to said convex shaft, so that said wing sheet and said convex shaft are able to be respectively positioned in an elongated guiding slot with a relative sliding means, and said elongate guiding slot is formed between an opposite end part of said first linkage member and said first casing body.

4. The hinge module for the foldable type device as claimed in claim 3, wherein said first action zone is formed as an axial guiding hole arranged on a plate surface of said linkage plate, said third action zone is a column vertically extended from an end part of said middle transmission member and moveably positioned in said axial guiding hole; one side of said slide member is extended with a lateral wing sheet in a direction towards said middle transmission member, said second action zone is a column vertically extended from a sheet surface of said lateral wing sheet, said fourth action zone is formed as an elongated guiding hole arranged at another end part of said middle transmission member, said column of said slide member is moveably positioned in said elongated guiding hole of said middle transmission member.

5. The hinge module for the foldable type device as claimed in claim 2, wherein said fourth linkage member has a linkage rod and a linkage plate; one end part of said linkage rod is pivoted with said fourth pivotal part, an opposite end part of said linkage rod is pivoted with one side of said linkage plate so as to formed said pivotal connecting point, an opposite end part of said linkage rod is protruded with a convex shaft, said convex shaft and said pivotal connecting point are arranged at a same rotating central line, said side of said linkage plate is protruded with a wing sheet, and said wing sheet is arranged to be parallel to said convex shaft, so that said wing sheet and said convex shaft are able to be respectively positioned in an elongated guiding slot with a relative sliding means, and said elongate guiding slot is formed between an opposite end part of said third linkage member and said third casing body.

6. The hinge module for the foldable type device as claimed in claim 5, wherein said first action zone is formed as an axial guiding hole arranged on a plate surface of said linkage plate, said third action zone is a column vertically extended from an end part of said another middle transmission member, said column is moveably positioned in said axial guiding hole of said fourth linkage member; one side of said another slide member is extended with a lateral wing sheet in a direction towards said another middle transmission member, said second action zone is a column vertically extended from a sheet surface of said lateral wing sheet, said fourth action zone is formed as an elongated guiding hole arranged at another end part of said another middle transmission member, said column of said another slide member is moveably positioned in said elongated guiding hole of said another middle transmission member.

7. The hinge module for the foldable type device as claimed in claim 2, wherein said first casing body is formed with at least one accommodating concave slot, and a wall surface defined in said accommodating concave slot is vertically extended with an internal column, another end part of said second linkage member is formed with a radial guiding hole which is able to be moveably positioned in said internal column of said first casing body, said slide member has an elastic unit, one end of said elastic unit is in contact with a wall surface of said at least one accommodating concave slot, another end of said elastic unit is in contact with said end part of said slide member.

8. The hinge module for the foldable type device as claimed in claim 2, wherein said third casing body is formed with at least one accommodating concave slot, and a wall surface defined in said accommodating concave slot is vertically extended with an internal column, another end part of said fourth linkage member is formed with a radial guiding hole which is able to be moveably positioned in said internal column of said third casing body, said another slide member has an elastic unit, one end of said elastic unit is in contact with a wall surface of said at least one accommodating concave slot, another end of said elastic unit is in contact with said end part of said another slide member.

9. The hinge module for the foldable type device as claimed in claim 2, wherein at least one lateral guiding rod is extended from a direction defined from said first casing body to said second casing body, and at least one recess and at least one position limiting column are correspondingly formed in said second casing body, so that said at least one lateral guiding rod is allowed to pass said at least one recess, then pass a gap formed between said at least one position limiting column and an inner wall of one of said two casings; opposite surfaces of said slide member and said lateral guiding rod are respectively formed with a position limiting slot and a block piece, said block piece is moveably positioned in said position limiting slot.

10. The hinge module for the foldable type device as claimed in claim 2, wherein at least one lateral guiding rod is extended from a direction defined from said third casing body to said fourth casing body, and at least one recess and at least one position limiting column are correspondingly formed in said fourth casing body, so that said at least one lateral guiding rod is allowed to pass said at least one recess, then pass a gap formed between said at least one position limiting column and an inner wall of one of said two casings; opposite surfaces of said another slide member and said lateral guiding rod are respectively formed with a position limiting slot and a block piece, said block piece is moveably positioned in said position limiting slot.

11. The hinge module for the foldable type device as claimed in claim 2, wherein an edge of said first casing body and an edge of said second casing body are respectively formed with a first stepped part and a second stepped part which are capable of being correspondingly engaged, said first stepped part is formed with a plurality of elongated ribs which are arranged in parallel, and said second stepped part is formed with a plurality of elongated convex strips which are arranged in parallel, said plurality of elongated ribs and said plurality of elongated convex strips are connected in an interleaved means and capable of mutually guiding each other.

12. The hinge module for the foldable type device as claimed in claim 2, wherein an edge of said third casing body and an edge of said fourth casing body are respectively formed with a third stepped part and a fourth stepped part which are capable of being correspondingly engaged, said third stepped part is formed with a plurality of elongated ribs which are arranged in parallel, and said fourth stepped part is formed with a plurality of elongated convex strips which are arranged in parallel, said plurality of elongated ribs and said plurality of elongated convex strips are connected in an interleaved means and capable of mutually guiding each other.

13. The hinge module for the foldable type device as claimed in claim 2, wherein an extending base is disposed between said two casings, and at least one hinge is disposed in said extending base, said end part of said first linkage member and said end part of said third linkage member are respectively pivoted to said at least one hinge, so that said at least one hinge is pivotally connected to said base; said base is formed with an axial extending part for partially shielding said end part of said first linkage member, said end part of said third linkage member and shielding a slit formed therebetween.

14. The hinge module for the foldable type device as claimed in claim 13, wherein said extending base has a base member and a cover plate covering said base member; at least one installation slot is concavely formed in said base member of said extending base for allowing said at least one hinge to be received; a first position limiting slot, a first hole, a second position limiting slot and a second hole are respectively formed at an axial side of said base member of said extending base, a first protrusion and a first corresponding hole are correspondingly formed on an axial wall surface of said end part of said first linkage member, a second protrusion and a second corresponding hole are correspondingly formed on an axial wall surface of said end part of said third linkage member, said first hole and said second hole and both provided with a spring and a roller interacting with said spring, two said rollers are respectively positioned in said first corresponding hole and said second corresponding hole, said first protrusion is moveably positioned in said first position limiting slot, said second protrusion is moveably positioned in said second position limiting slot.

15. The hinge module for the foldable type device as claimed in claim 1, wherein said second linkage member has a linkage rod and a linkage plate; one end part of said linkage rod is pivoted with said second pivotal part, an opposite end part of said linkage rod is pivoted with one side of said linkage plate so as to formed said pivotal connecting point, an opposite end part of said linkage rod is protruded with a convex shaft, said convex shaft and said pivotal connecting point are arranged at a same rotating central line, said side of said linkage plate is protruded with a wing sheet, and said wing sheet is arranged to be parallel to said convex shaft, so that said wing sheet and said convex shaft are able to be respectively positioned in an elongated guiding slot with a relative sliding means, and said elongate guiding slot is formed between an opposite end part of said first linkage member and said first casing body.

16. The hinge module for the foldable type device as claimed in claim 15, wherein said first action zone is formed as an axial guiding hole arranged on a plate surface of said linkage plate, said third action zone is a column vertically extended from an end part of said middle transmission member and moveably positioned in said axial guiding hole; one side of said slide member is extended with a lateral wing sheet in a direction towards said middle transmission member, said second action zone is a column vertically extended from a sheet surface of said lateral wing sheet, said fourth action zone is formed as an elongated guiding hole arranged at another end part of said middle transmission member, said column of said slide member is moveably positioned in said elongated guiding hole of said middle transmission member.

17. The hinge module for the foldable type device as claimed in claim 1, wherein said first casing body is formed with at least one accommodating concave slot, and a wall surface defined in said accommodating concave slot is vertically extended with an internal column, another end part of said second linkage member is formed with a radial guiding hole which is able to be moveably positioned in said internal column of said first casing body, said slide member has an elastic unit, one end of said elastic unit is in contact with a wall surface of said at least one accommodating concave slot, another end of said elastic unit is in contact with said end part of said slide member.

18. The hinge module for the foldable type device as claimed in claim 1, wherein at least one lateral guiding rod is extended from a direction defined from said first casing body to said second casing body, and at least one recess and at least one position limiting column are correspondingly formed in said second casing body, so that said at least one lateral guiding rod is allowed to pass said at least one recess, then pass a gap formed between said at least one position limiting column and an inner wall of one of said two casings; opposite surfaces of said slide member and said lateral guiding rod are respectively formed with a position limiting slot and a block piece, said block piece is moveably positioned in said position limiting slot.

19. The hinge module for the foldable type device as claimed in claim 1, wherein an edge of said first casing body and an edge of said second casing body are respectively formed with a first stepped part and a second stepped part which are capable of being correspondingly engaged, said first stepped part is formed with a plurality of elongated ribs which are arranged in parallel, and said second stepped part is formed with a plurality of elongated convex strips which are arranged in parallel, said plurality of elongated ribs and said plurality of elongated convex strips are connected in an interleaved means and capable of mutually guiding each other.

* * * * *